United States Patent [19]
Janssens et al.

[11] Patent Number: 5,616,930
[45] Date of Patent: Apr. 1, 1997

[54] RADIATION IMAGE DISPLAYING METHOD AND APPARATUS

[75] Inventors: Danny Janssens, Eindhout; Emile Schoeters, Lier; Pieter Vuylsteke, Mortsel; Frans Dhaenens, Hever, all of Belgium

[73] Assignee: Agfa-Gevaert, Mortsel, Belgium

[21] Appl. No.: 542,096

[22] Filed: Oct. 12, 1995

Related U.S. Application Data

[63] Continuation of Ser. No. 385,064, Feb. 7, 1995, abandoned, which is a continuation of Ser. No. 49,077, Apr. 20, 1993, abandoned.

[30] Foreign Application Priority Data

Apr. 21, 1992 [EP] European Pat. Off. .............. 92201106

[51] Int. Cl.⁶ .................................................. G03B 42/02
[52] U.S. Cl. ........................................................ 250/584
[58] Field of Search ........................... 250/584; 395/153; 364/413.22

[56] References Cited

U.S. PATENT DOCUMENTS

| | | | |
|---|---|---|---|
| 4,739,480 | 4/1988 | Oono et al. | 364/413.13 |
| 4,812,998 | 3/1989 | Maeda | 395/157 |
| 4,960,993 | 10/1990 | Shigyo et al. | 250/584 |
| 5,015,854 | 5/1991 | Shigyo et al. | 250/584 |

FOREIGN PATENT DOCUMENTS

1-193838  8/1989  Japan .................................. 250/584

*Primary Examiner*—Constantine Hannaher
*Attorney, Agent, or Firm*—Richard J. Birch

[57] ABSTRACT

Method and apparatus for displaying images obtained by reading out stimulable phosphor screens wherein radiation images are stored. A mosaic type image is composed by means of a plurality of read-out images and said mosaic type image is displayed on a preview monitor or on one of a plurality of preview monitors.

14 Claims, 3 Drawing Sheets

FIG. 3

RADIATION IMAGE DISPLAYING METHOD AND APPARATUS

DESCRIPTION

This application is a continuation of application Ser. No. 08/385,064 filed on Feb. 7, 1995, now abandoned, which is a continuation of application Ser. No. 08/049/077 filed on Apr. 20, 1993, now abandoned.

FIELD OF THE INVENTION.

The present invention is in the field of digital radiography. The invention more specifically relates to a method and an apparatus for displaying (a) radiologic image(s).

BACKGROUND OF THE INVENTION

In the field of digital radiography a wide variety of image acquisition techniques have been developed such as computerised tomography, nuclear magnetic resonance, ultrasound, detection of a radiation image by means of a CCD sensor or a video camera, radiographic film scanning etc.

Still another technique has been developed wherein a radiation imager for example x-rays transmitted by an object, is stored in a screen comprising a photostimulable phosphor such as one of the phosphors described in European patent application 503 702 published and in U.S. Ser. No. 07/842,603, now U.S. Pat. No. 5,340,661.

The technique for reading out the stored radiation image consists of scanning the screen with stimulating radiation, such as laser light of the appropriate wavelength, detecting the light emitted upon stimulation and converting the emitted light into an electric representation for example by means of a photomultiplier. This technique further comprises digitizing and processing said electric signal and applying it to a recorder for recording a hard copy for example on film. This hard-copy can be viewed on a lightbox for diagnosic purposes.

After read-out of the image stored in the photostimulable phosphor screen one disposes of an electric image representation that can be applied to a monitor for display of the corresponding visual image.

Apparatus for performing the above-described image acquisition methods are commonly accompanied by a preview monitor to which the image signal is applied before being sent to an output device, i.e. a recorder or a workstation.

The image can be then be evaluated either on the recorded hard-copy or on the display unit of the workstation or on the preview monitor.

However, before the image is available at the output of the hard copy recorder, some time passes due to the duration of the recording process including the development of the film and occacionally due to formation of a queue of image signals waiting to be reproduced by the recorder.

Also when the image is shown and evaluated at the workstation some processing time is to be taken into account before the visible image is available.

Inspection on the preview monitor on the other hand can be performed almost immediately after acquisition and hence provides for early feedback to the operator so that corrections can be performed in case the acquisition went wrong.

In hospitals that dispose of several radiology rooms it is possible that a preview monitor is installed in each radiology room in addition to a central preview monitor that is provided in the vicinity of an image acquisition apparatus.

Immediately following acquisition, the acquired image is shown on the central monitor and eventually also on monitors that are locally provided in the radiology rooms so that the evaluation can be made by the operator who is occupied in each of the rooms. Evaluation can be made very fast after image acquisition so that in case of mis-acquisition the error can be immediately corrected.

Sequentially acquired images are sequentially shown on the monitor(s). This mode of operation allows fast evaluation but has the disadvantage that the period of time of which the operator disposes to make an evaluation depends on the period of time between the display of a first image and the moment on which data regarding a subsequent image are available. Typically this is for example in a system wherein an image is read-out from a photostimulable phosphor screen about 1 minute. So, it may happen that an image is already removed from the display and a subsequent image is displayed while the operator did not yet have the opportunity to evaluate the former image on the display unit.

This problem is partially solved by providing the acquisition apparatus with an interaction modality for example implemented by a wait, cancel and proceed function. Upon activation of the wait function for example in a system wherein images are stored in photostimulable phosphor screens, the operator can interrupt the process of successively reading out a sequence of phosphor screens so that he can study and evaluate a read out image on the preview monitor until he activates the cancel or proceed function.

Upon activation of the proceed function the acquired image signal is sent further to the output device whereas upon activation of the cancel function, the image signal is no longer retained. After activation of either of these functions, the interruption is terminated and the acquisition apparatus starts acquiring a next image.

By using these functions the operator can dispose of a longer period of time to make a first evaluation on the preview monitor. However, this procedure decreases the throughput of the read-out apparatus.

In case more than one monitor is provided and every acquired image is sent to each of the monitors, it may occur that an operator who is occupied in one radiology room and makes his evaluation on the locally provided monitor needs to let pass the images taken in other rooms. Since these images are of no interest to him, this brings about a waste of time and even demands from the operator increased attention to detect among the displayed images those images made in the radiology room of interest.

U.S. Pat. No. 5,015,854 issued May 14, 1991 discloses a configuration of a workstation (not preview monitor) to be interfaced with a signal gathering apparatus.

The disclosure deals in particular with the retrieval of particular images out of said large number of images stored in a storage device.

The retrieval is performed with the aid of outline images.

When a stored image is to be retrieved by the operator of the workstation, a number of outline images is displayed simultaneously on the display device so that the operator can select the image of interest on the basis of low detailed pictorial information displayed on the monitor screen. On the basis of this selection he can order display of the complete non-reduced image.

This method is generally referred to as "pictorial index" and has been described extensively by Th. Wendler et al. in Pictorial Information Systems in Medicine, published in Nato ASI Series, Vol. F19.

OBJECTS OF THE INVENTION

It is an object of the invention to provide a display system that enables quasi immediate evaluation after image acquisition and still gives the operator a reasonable amount of time to make an evaluation on the basis of this display without retarding the operation and without decreasing the throughput of the acquisition apparatus.

It is another object of the present invention to provide such a display system adapted to a situation of multiple radiology rooms and a central image acquisition system.

It is a further object is to provide a display system wherein the image quality of the displayed image is such that the displayed image is sufficiently similar to the final image to allow image evaluation.

It is still a further object to provide such a display system to be used in connection with an image acquisition system wherein a radiation image that was stored in a photostimulable phosphor screen is read-out by scanning said screen with stimulating radiation, detecting the light emitted upon evaluation and converting the detected light into a digital signal representation.

Further objects will become apparent from the description hereinafter.

SUMMARY OF THE INVENTION

The objects of the present invention are achieved by a method of displaying on a display device radiation images each represented by a digital signal representation characterised by the steps of deducing reduced image signals from said digital signals, said reduced signals representing reduced images comprising less pixels than said radiation images, forming a composed signal representing a mosaic type image by means of a number of reduced image signals, applying said composed signal to said display device, as a new reduced signal is deduced, amending said composed signal by means of said new signal so that at least one of the reduced images in the displayed image is replaced by the image represented by said new reduced signal and applying said amended signal to said display device.

For application in case more than one display devices is provided, the invention provides a method of displaying radiation images each being represented by a digital signal representation on one of a plurality of display devices comprising the steps of associating a code identifying one of said plurality of display devices with each of said signals, and applying each of said signals to the identified display device for display.

The invention further provides a method of displaying radiation images each represented by a digital signal representation on one of a plurality of display devices comprising the steps of associating with each of said digital signals a code identifying one of a plurality of display devices, deducing reduced image signals representing reduced images from said digital signals, forming composed signals representing mosaic type images by means of a number of reduced image signals originating from digital signals with an identical associated code, applying each of said mosaic type image representing signals to an identified display device, as a new reduced signal is deduced, amending a composed signal composed with signals with the same associated code by means of said new reduced image signal so that at least one of the reduced images in the displayed image is replaced by the image represented by said new reduced signal and applying said amended signal to the display device identified by said associated code.

By the term "mosaic-type" image is meant an image composed of a two-dimensional array of individually distinguishable images that together cover the entire addressable area of a display device. Such-like "mosaic-type images" can be compared with the mosaic-type image that is used in television broadcasting, wherein an image is displayed that is composed of an array of smaller images each showing the program broadcasted on a particular channel.

The number of reduced images (represented by the above-defined reduced signals) that together compose a mosaic type image depends on the number of addressable pixels in the display device and on the number of pixels in each of the reduced images.

In one embodiment the radiation image is stored in a photostimulable phosphor screen and the digital signal representation of said radiation image is obtained by scanning said screen with stimulating radiation, detecting the light emitted upon stimulation and converting the detected light into a digital signal.

In the following the invention will be explained with reference to such an image acquisition system. It will be clear that this invention is not limited to this kind of image acquisition system and that alternatives may be envisioned.

The invention is particularly advantageous for display of radiographic images on a preview monitor. However, the invention is not limited to display on a preview monitor and in the following whenever the term "preview monitor" is used, it can be replaced by another kind of display device.

By applying the method of the present invention to the images that are displayed on the preview monitor the operator disposes of a longer period of time to make a first evaluation of the recorded image.

The embodiment of the method of the present invention relating to the display of mosaic type images on a plurality of monitors can provide that only those images that relate to exposures made in one radiology room are sent to the preview monitor installed in said room and that, if a mosaic type image is displayed at the local preview monitor, this mosaic type image is only composed of these component images.

Reduced image signals can be deduced from the digital signal representation obtained by reading out a photostimulable phosphor screen by subsampling, i.e. by sampling the digital signal at every nth position in a row and every mth position in a column of the array of pixel elements representing the image.

Alternatively a reduced image signal can be obtained by interpolation of the pixel values.

In European patent application 527 525 filed 14 August 1991 and published on 22 February 1993 a contrast enhancing method is disclosed which comprises the steps of receiving an original digital image represented by an array of pixel values, processing said original image and recording the processed image on a recording medium or visualising it on a display monitor, said processing comprising the steps of a) decomposing said original image into a sequence of detail images at multiple resolution levels and a residual image at a resolution lower than the minimum of said multiple resolution levels, b) modifying the pixel values of said detail images to yield pixel values of a set of modified detail images by means of at least one non-linear monotonically increasing odd mapping function with a slope that gradually decreases with increasing argument values and c) computing said processed image by applying a reconstruction algorithm to the modified detail images and the residual image, the reconstruction algorithm being such that when applied to the detail images and the residual image said original image or a close approximation thereof would be obtained.

In a specific embodiment of the invention described in the above European patent application the original image is decomposed into a so-called pyramidal sequence of detail images, i.e. successively formed detail images in the set of multiresolution detail images have a reduced number of pixels.

For example, the multiresolution representation after decomposition may have a pyramidal structure such that the resolution level of the detail images differs by a factor of 2, and the detail images at each resolution level are calculated by filtering the original image with the difference of two low-pass filters and by subsampling the resulting image by a factor 2.

The used filter preferably has a two dimensional Gaussian distribution.

This procedure can be implemented as follows. The original image is filtered by means of a low pass filter as described above, and subsampled by a factor of two, which is implemented by computing the resulting low resolution approximation image $g_1$ only at every other pixel position of every alternate row.

A detail image $b_0$ at the finest level is obtained by interpolating the low resolution approximation $g_1$ with doubling of the number of rows and columns, and pixelwise subtracting the interpolated image from the original image.

The interpolation is effectuated by an interpolator, which inserts a column of zero values every other column, and a row of zero values every other row respectively, and next convolves the extended image with a low pass filter. The subtraction is done by an adder.

The same process is repeated on the low resolution approximation $g_1$ instead of the original image, yielding an approximation of still lower resolution $g_2$ and a detail image $b_1$.

A sequence of detail images $b_i$, i=0 ... L–1 and a residual low resolution approximation $g_L$ are obtained by iterating the above process L times.

The finest detail image $b_0$ has the same size as the original image. The next coarser detail image $b_1$ has only half as many rows and columns as the first detail image $b_0$. At each step of the iteration the maximal spatial frequency of the resulting detail image is only half that of the previous finer detail image, and also the number of columns and rows is halved, in accordance with the Nyquist criterion. After the last iteration a residual image $g_L$ is left which can be considered to be a very low resolution approximation of the original image. In the extreme case it consists of only 1 pixel which represents the average value of the original image.

When this kind of image decomposition is applied, it is advantageous to use one of the intermediate low resolution images that are generated during the decomposition of the image into a set of detail images and a residual image as the reduced image when composing the mosaic type image.

According to the image processing method described in the above mentioned European application EP 527 525 the pixel values of said detail images are modified to yield pixel values of a set of modified detail images. Preferably, the modification is performed according to at least one non-linear monotonically increasing odd mapping function with a slope that gradually decreases with increasing argument values.

Finally a processed image is computed by applying a reconstruction algorithm to the residual image and the modified detail images. The above mentioned European application EP 527 525 describes such-like reconstruction algorithms.

In one embodiment of such a reconstruction algorithm the residual image is first interpolated by interpolator to twice its original size and the interpolated image is next pixelwise added to the detail image of the coarsest level $b'_{L-1}$, using an adder. The resulting image is interpolated and added to the next finer detail image. If this process is iterated L times using the unmodified detail images $b_{L-1}$ ... then an image equal to the original image will result. If at the other hand the detail images are modified before reconstruction, then a processed image, for example a contrast enhanced image will result. The interpolators are identical to those used in the decomposition section.

The reduced image used for the composition of the mosaic type image may then consist of an image generated during the reconstruction process, said reconstruction process being limited up to some intermediate resolution level which is lower than the original resolution.

The above-described embodiments are advantageous because the reduced image obtained by application of the above decomposition or reconstruction process has a better image quality than a subsampled image, and this high quality image is obtained in a fast way, the method does not require any additional computational effort since during the image processing the above intermediate images are already available.

According to the present invention the mosaic type image representing signal is amended each time a new reduced image signal is available so that at least one of the reduced images in the displayed mosaic-type image is replaced by the image corresponding with said new reduced signal.

The position of the replacement image in the mosaic type image can be selected.

It is preferred that the reduced image component of the mosaic type image, that was first available for the composition of the mosaic type image is replaced by the new image since the former was visible on the screen during the longest period of time. However, this is not essential of the present invention, it is merely a matter of design choice and alternative embodiments might be implemented.

Also for the component images in the mosaic type image that are not overwritten alternative embodiments are possible.

The method can be implemented so that when a new reduced image becomes available, the reduced image represented by the reduced image signal that was first available is overwritten and that the location of the other component images remains unchanged.

Alternatively the new reduced image may come in the place of the reduced image represented by the former reduced image signal. Then the image corresponding with the reduced signal component that was first available may be dropped and the other images may be shifted in a predetermined order to cover the locations in the mosaic image therein between.

Still alternative embodiments may be envisioned.

In the embodiment of the present invention incorporating a plurality of monitors the selection of the images that are to be sent to a specific monitor comprising the steps of after image signal acquisition, associating a code identifying a monitor with an acquired image signal and displaying said image on the identified monitor.

In case of composition of a mosaic type image on one of a plurality of monitors, a reduced image signals to which an identical code was associated will add to the composition of a mosaic type image to be displayed on the monitor identified by means of said code.

In one embodiment of the present invention the radiation image is stored in a photostimulable phosphor screen and the identification code is witten into an electrically erasable programmable read only memory (EEPROM) that is provided for identification purposes on a cassette conveying the stimulable phosphor screen. The provision of a such-like EEPROM chip on a cassette has been described extensively in German patent application 37 31 204.

Data relating to the exposed object, such as the patient name, and to the exposure, such as the name of the radiologist and the type of examination to be performed, are written onto the EEPROM by means of an identification camera. Supplementary to these identification data a code identifying the preview monitor to which the read-out image is to be sent can also be provided on this EEPROM device.

These data are read-out in the radiation image read out apparatus and accompany the image representing digital signal through the image processing and image recording step.

In a practical situation an identification station is often provided in each of the radiology rooms. The station itself is identified by a code, so that when the code of the identification station is associated with the screen during the identification procedure (for example written on the EEPROM on the cassette), this code automatically identifies the radiology room where the record was made and the preview monitor provided in said room. In this way, no additional identification needs to be performed.

Alternative ways of identification of the preview monitor to which the read-out image signal is to be sent are enumerated hereinbelow, this list being non-exhaustive. These data or part thereof can also be written on an identification card such as a magnetic card or on an optically readable card, it can be provided in the form of a bar code or it can be entered manually, for example by means of a keyboard input.

The present invention further discloses an apparatus for performing the method of the present invention. The apparatus comprises means for deducing a reduced image signal from said digital signal, means for forming a composed signal representing a mosaic type image by means of a number of said reduced image signals, a display device to which said composed signal is applied, control means providing that when a new reduced image signal is deduced, a new composed signal is formed so that at least one of the component images in the mosaic-type image is replaced by the image represented by the new reduced signal and that said new composed signal is fed to said display device.

For application in a system comprising a plurality of display devices the present invention provides an apparatus comprising means for determining an identification code identifying a display device, said code being associated with an acquired image, means for applying said digital signal to the display device identified by said code.

The invention further discloses an apparatus for displaying radiation images each being repesented by a digital signal representation on one of a plurality of display devices comprising means for determining an identification code associated with an image, said code identifying one of said plurality of display devices, means for deducing a reduced image signal from a digital signal, a plurality of display devices each being identified by an identification code and each comprising means for forming a composed signal representing a mosaic type image by means of a number of said reduced image signals to which the same identification code was associated, and each being provided with control means providing that when a new reduced image signal with the same identification code is deduced, a new composed signal is formed so that at least one of the component images in the mosaic-type image is replaced by the image represented by the new reduced signal and that said new composed signal is fed to said display device.

Preferably said control means comprise a serial memory capable of storing at least said N reduced image signals, clock signal generating means for timing the read-out of said serial memory at regular intervals and for timing the application of the reduced signals into said means for forming the composed signal.

In a particular embodiment said radiation image is stored in a photostimulable phosphor screen, and a digital signal representation of said image is obtained by an image acquisiiton apparatus comprising means for scanning a photostimulable screen wherein a radiation image is stored with stimulating irradiation, means for detecting the light emitted upon stimulation and means for converting said detected light into a digital signal. In this particular embodiment the means for determining an identification code comprise means for reading out a code from an electronic memory device provided on a cassette conveying the photostimulable phosphor screen wherein a radiation image has been stored.

In the above described embodiments the display apparatus can additionally be provided with means for selecting either display of a single non-reduced image or display of a mosaic type image.

BRIEF DESCRIPTION OF THE DRAWINGS

Particular aspects of the present invention as well as preferred embodiments thereof will be explained by means of the corresponding drawings wherein FIG. 1 generally shows a system for reading out an image stored in a photostimulable phosphor screen.

Figure 1:
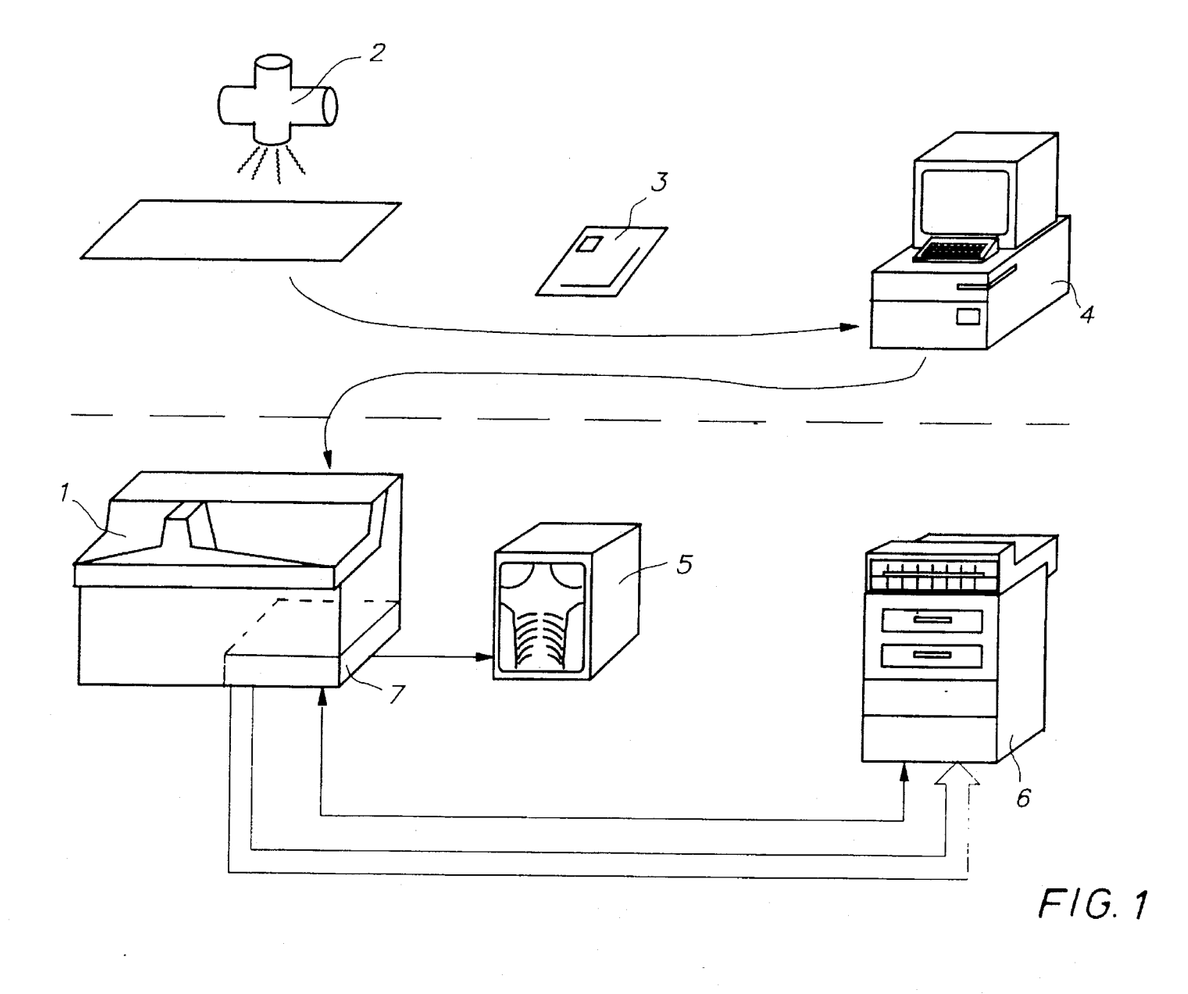

FIG. 1 generally shows an apparatus in which the method of the invention can be applied.

A radiation image of an object was recorded on a photostimulable phosphor screen (3) by exposing (2) said screen to x-rays transmitted through the object (not shown). The stimulable phosphor screen was conveyed in a cassette (3) provided with an electrically erasable programmable read only memory (EEPROM). In an identification station 4 various kinds of data, for example patient identification data (name, date of birth) and data relating to the exposure and/or to the signal processing were written into the EEPROM.

In a radiation image read-out apparatus 1 the image stored in the photostimulable phosphor screen was read-out by scanning the phosphor screen with stimulating rays emitted by a laser. The stimulating rays were deflected into the main scanning direction by means of galvanometric deflection. The subscanning was performed by transporting the phosphor screen in the subscanning direction. The stimulated emission was directed onto a photomultiplier for conversion into an electrical image representation. Additionally the information stored in the EEPROM was read.

Figure 2:
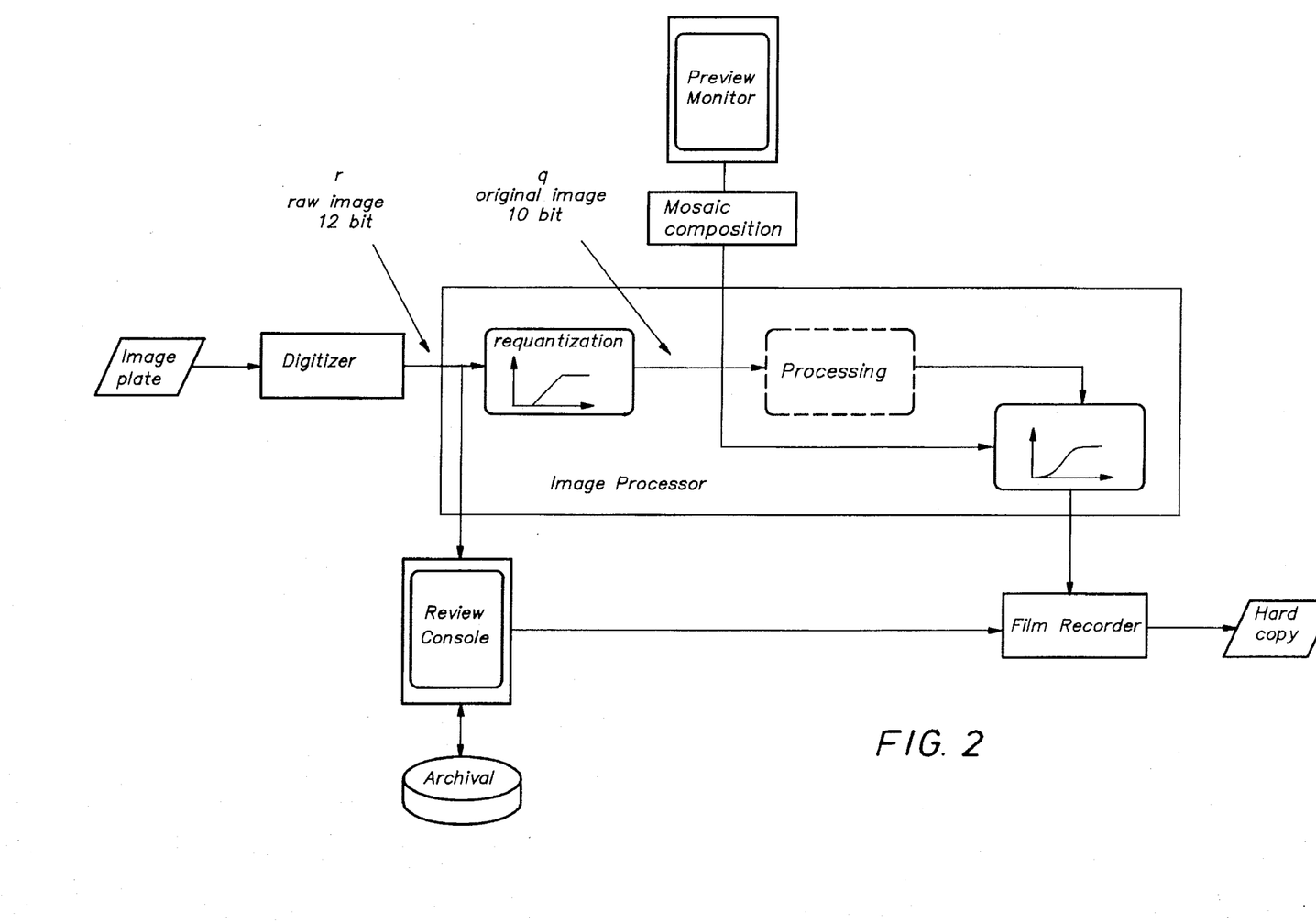
FIG. 2 is a block scheme illustrating the data flow.

The subsequent data flow is illustrated in FIG. 2. The output signal of the photomultiplier was converted into a logaritmic quantity log E (E being the exposure value), and next the signal quantised. This quantised image signal, called the raw image signal, was sent to the image processing module of the read-out apparatus (FIG. 1, numeral 7) where it was stored in an internal buffer.

From the image processor the image was sent to the preview monitor (FIG. 1, numeral 5).

Without any modifications it was also sent from the image processor to an image workstation where it was temporarily stored on a hard disc. This back up ensured that the signal was never lost, even not when any of the components of the apparatus would fail and that the signal could be retrieved for any kind of later processing, for example processing with different parameter setting. This feature could be used when the result of the on-line processing was unsatisfactory due to bad exposure conditions or inadequate selection of the processing parameters.

The latitude of the raw image is normally too large to be printed on film or to be displayed on a monitor. Therefore the latitude was confined to the diagnostically relevant region (requantization). The result hereof returned a 10 bit image, representing an image proportional to log exposure, where the grey levels below and above the diagnostically relevant region were clipped to zero and 1023 respectively.

Then the signal was fed to a circuit for forming a composed signal representing a mosaic type image, the output signal of this circuit was further applied to the frame buffer of the preview monitor for display.

It was also possible to display a single non-composed image.

Figure 3:
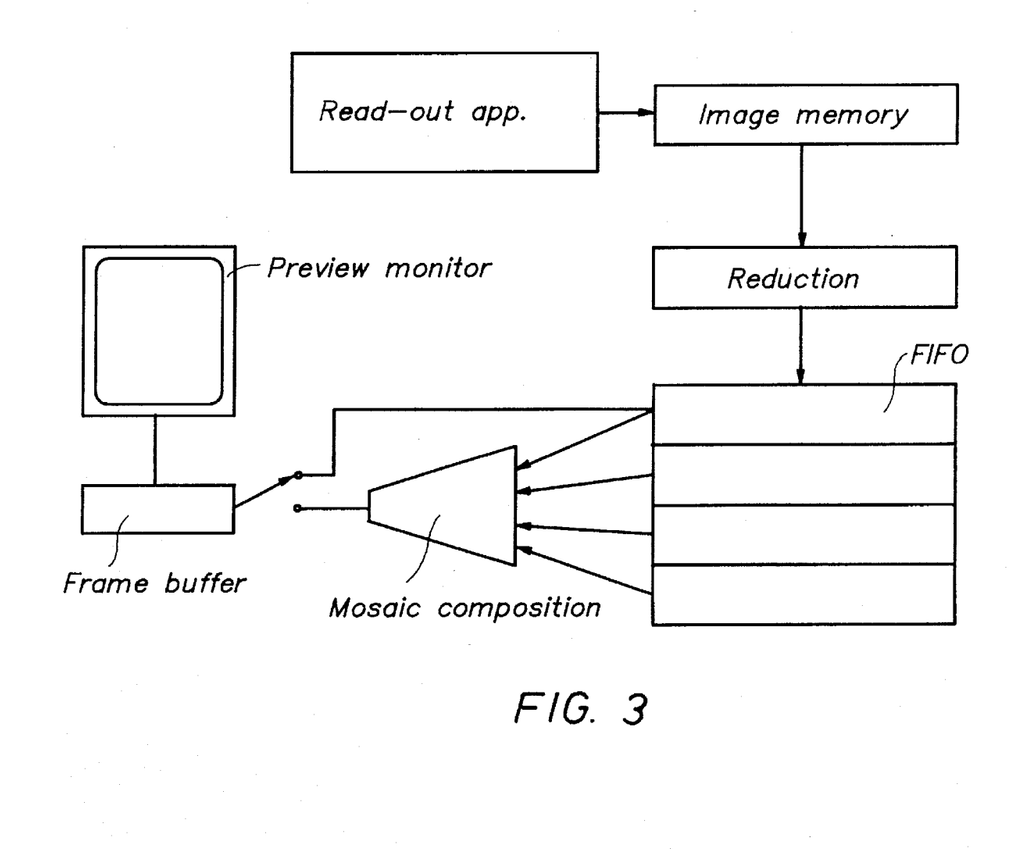
FIG. 3 is a scheme illustrating particular aspects of the present invention.

The composition of the mosaic type representing signal is explained with reference to FIG. 3.

The number of pixels read-out by the apparatus in the present application was 2048 pixels per line multipied by 2048 lines per image, the number of lines that is scanned being a function of the format of the screen in wherein the image was stored.

A reduced signal was extracted from the image signal by subsampling. The number of pixels was reduced by a factor 16 to 512×512 pixels.

Then the reduced signal was written into a first in, first out memory comprising 4 memory locations.

The above-described procedure was repeated under control of appropriate control and clock signals (not indicated in the figure) for subsequently read-out image signals so that the fifo was completely filled.

Figure 4:
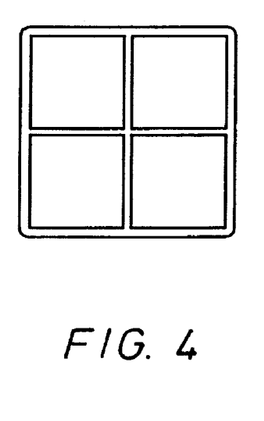
FIG. 4 shows a mosaic-type image.

Next the fifo was read-out and the read-out signals were fed into a subsampling ciruit wherein each second pixel was retained. By means of the resulting signals, a mosaic type image as shown in FIG. 4 was composed of 4 individually recognizable images corresponding with the subsampled signals and together occupying the total number of addressable elements in the monitor.

As a new image was read-out the corresponding reduced signal was written into the first location of the fifo and the data in the other locations were shifted, the first read-in signal was dropped. Then a new signal representing a new mosaic type image was composed, fed to the frame buffer of the preview monitor and displayed.

The explanation relating to the operation of the formation of the mosaic-type image was given hereinbefore for a single monitor. In case more than one monitor is coupled to a single read-out device, the code identifying the monitor where the display of a particular image is desired was written into the EEPROM provided on the cassette wherein the image storing phosphor is conveyed and read-out in the read-out apparatus as described higher.

The apparatus then additionally comprises switching means controlled in function of the read-out identification code so as to feed the reduced signals to the identified monitor and associated first in, first out memory and composition circuitry. A mosaic type image is then composed by means of signals with the same associated code.

Display of the images on the preview monitor(s) was followed by mapping of signal values (in this case log exposure) values into corresponding density values according to a specified gradation mapping curve and the image signal was passed to a laser recorder for hard copy recording.

Occasionally this mapping can be preceded by additional signal processing such as contrast enhancement processing.

We claim:

1. A method of displaying on a display device radiation images each represented by a digital signal representation characterised by the steps of:

deducing reduced image signals from said digital signal representation, said reduced signals representing reduced images comprising less pixels than said radiation image each reduced image being obtained by
  (i) subjecting an image to decomposition into a multi-resolution pyramidal representation,
  (ii) modifying pixel values of the multi-resolution pyramidal representation at at least one resolution level according to a non-linear increasing odd mapping function with a slope that gradually increases with increasing argument values, to yield pixel values of a modified multi-resolution representation,
  (iii) reconstructing a modified image by applying to the modified multi-resolution representation the inverse of said decomposition up to an intermediate resolution level which is lower than the original resolution of said image, forming a composed signal representing a mosaic type image by means of a number of reduced image signals, applying said composed signal to a display device, as a new reduced signal is deduced, amending said composed signal by means of said new signal so that at least one of the reduced images in the displayed image is replaced by the image represented by said new reduced signal and applying said amended signal to said display device.

2. A method according to claim 1 wherein a digital signal representation of a radiation image is obtained by scanning a photostimulable phosphor screen wherein a radiation image has been stored with stimulating radiation, detecting the light emitted upon stimulation and converting said light into a digital signal.

3. A method according to claim 1 modified in that a reduced image is obtained by subjecting an image to decomposition into a multiresolution pyramidal representation, processing said representation and reconstructing a processed image and wherein said reduced image is an intermediate image obtained during reconstruction processing up to some intermediate resolution level which is lower than the original image resolution.

4. A method according to claim 3 wherein a digital signal representation of a radiation image is obtained by scanning a photostimulable phosphor screen wherein a radiation image has been stored with stimulating radiation, detecting the light emitted upon stimulation and converting said light into a digital signal.

5. A method according to claim 1
wherein a digital signal representation of a radiation image is obtained by scanning a photostimulable phosphor screen wherein a radiation image has been stored with stimulating radiation, detecting the light emitted upon stimulation and converting said light into a digital signal; and,
wherein said reduced image is obtained as a low resolution approximation obtained by decomposing said radiation image(s) into a multiresolution pyramidal representation.

6. The method of claim 1 wherein said display device is a phosphor readout and said amended signal stimulates the phosphor of said phosphor readout.

7. A method of displaying radiation images each being represented by a digital signal representation on one of a plurality of display devices comprising the steps of
associating with each of said digital signals a code identifying one of a plurality of display devices,
(i) Subjecting an image to decomposition into a multi-resolution pyramidal representation,
(ii) modifying pixel values of the multi-resolution pyramidal representation at at least one resolution level according to a non-linear increasing odd mapping function with a slope that gradually increases with increasing argument values, to yield pixel values of a modified multi-resolution representation,
(iii) reconstructing a modified image by applying to the modified multi-resolution representation the inverse of said decomposition up to an intermediate resolution level which is lower than the original resolution of said image,
forming composed signals representing mosaic type images by means of a number of reduced image signals originating from digital signals with an identical associated code,
applying each of said mosaic type image representing signals to an identified display device,
as a new reduced signal is deduced, amending a composed signal composed with signals with the same associated code by means of said new reduced image signal so that at least one of the reduced images in the displayed image is replaced by the image represented by said new reduced signal and applying said amended signal to the display device identified by said associated code.

8. A method according to claim 7 wherein said radiation image has been subjected to decomposition into a multi-resolution pyramidal representation and wherein said reduced image is an intermediate image obtained during reconstruction processing up to some intermediate resolution level which is lower than the original image resolution.

9. A method according to claim 8 wherein a digital signal representation of a radiation image is obtained by scanning a photostimulable phosphor screen wherein a radiation image has been stored with stimulating radiation, detecting the light emitted upon stimulation and converting said light into a digital signal.

10. A method according to claim 7 wherein a digital signal representation is acquired by scanning a photostimulable phosphor screen wherein a radiation image has been stored with stimulating rays, detecting the light emitted upon stimulation, and converting said light into a digital signal, and wherein said identification code is read-out of an electronic memory device that is provided on a cassette conveying a photostimulable phosphor screen.

11. A method according to claim 7 wherein a digital signal representation of a radiation image is obtained by scanning a photostimulable phosphor screen wherein a radiation image has been stored with stimulating radiation, detecting the light emitted upon stimulation and converting said light into a digital signal.

12. A method of displaying radiation images each being represented by a digital signal representation on a plurality of devices comprising the steps of:
associating with each of said digital signals a code identifying one of a plurality of display devices,
deducing reduced image signals representing reduced images from said digital signal representations, said reduced signals representing images comprising less pixels than said radiation image and each reduced image generated by the steps of:
(i) decomposing an image into a multi-resolution pyramidal representation,
(ii) modifying pixel values of the multi-resolution pyramidal representation at at least one resolution level according to a non-linear increasing odd mapping function with a slop that gradually increases with increasing argument values, to yield pixel values of a modified multi-resolution representation,
(iii) reconstructing a modified image by applying to the modified multiresolution representation the inverse of said decomposition up to an intermediate resolution level which is lower than the original resolution of said image,
forming composed signals representing mosaic type images by means of a number of reduced image signals originating from digital signals with an identical associated code,
applying each of said mosaic type image representing signals to an identified display device,
as a new reduced signal is deduced, amending a composed signal composed with signals with the same associated code by means of said new reduced image signal so that at least one of the reduced images in the displayed image is replaced by the image represented by said new reduced signal and applying said amended signal to the display device identified by said associated code.

13. A method according to claim 12 wherein a digital signal representation of a radiation image is obtained by scanning a photostimulable phosphor screen wherein a radiation image has been stored with stimulating radiation, detecting the light emitted upon stimulation and converting said light into a digital signal, and wherein said identification code is read-out of an electronic memory that is provided on a cassette conveying a photostimulable phosphor screen.

14. A method according to claim 12 wherein a digital signal representation of a radiation image is obtained by scanning a photostimulable phosphor screen wherein a radiation image has been stored with stimulating radiation, detecting the light emitted upon stimulation and converting said light into a digital signal.

* * * * *